Sept. 29, 1936.    F. B. STEARNS    2,056,057
METHOD OF SCAVENGING AND SUPERCHARGING TWO-CYCLE ENGINES
Filed Oct. 11, 1932    2 Sheets-Sheet 2

INVENTOR.
Frank Ballou Stearns.
BY
His ATTORNEYS

Patented Sept. 29, 1936

2,056,057

UNITED STATES PATENT OFFICE 2,056,057

METHOD OF SCAVENGING AND SUPERCHARGING TWO-CYCLE ENGINES

Frank Ballou Stearns, Shaker Heights, Ohio

Application October 11, 1932, Serial No. 637,278

8 Claims. (Cl. 123—53)

This invention relates to methods of scavenging and super-charging two-cycle internal combustion engines.

While my invention has a particular application to two-cycle engines of the Diesel type, it is applicable in various aspects thereof to two-cycle internal combustion engines generally.

Heretofore it has been necessary to inject into the cylinders of internal combustion engines, as, for example, engines of the full Diesel type, air under high pressure to ensure a sufficient compression temperature of the charge. Pressures as high as 1000 lbs. per square inch have been employed. The considerable amount of energy utilized in effecting such pressures has lowered the engine efficiency as a whole. I have evolved a method whereby the desired high compression pressure may be attained from a relatively low pressure supply of air, as low in fact as 3.5 lbs. per square inch.

Often it has heretofore been found necessary, in order to efficiently scavenge the burned gases from two-cycle engine cylinders on the completion of the working stroke, to employ an additional air pump or crank case compression to accomplish this purpose. This has been an additional factor in lowering the engine efficiency. In the method contemplated by my invention, the necessity for a scavenging pump is obviated.

I have found furthermore that the efficiency of the super-charging and scavenging operations may be improved by supplying the low pressure air from a low pressure source as a blower of the impeller type delivering air in waves or pulses and suitably synchronizing the pressure peaks of the air flow with the scavenging and supercharging operations.

It is therefore an object of my invention to provide an improved method of scavenging and/or super-charging internal combustion cylinders.

It is another object of my invention to provide a method of supercharging and/or scavenging an internal combustion engine by air at relatively low pressure.

Another object of my invention is to eliminate the necessity of employing a high pressure air compressor for the scavenging and/or supercharging of an internal combustion engine.

Another object of my invention is to provide a method whereby the peak air pressure from the rotor or impeller of an impeller type air pump supplying air to an engine cylinder, may be synchronized with the admission of air in the piston movement cycle so that the maximum of pressure and volume of air may be admitted to the cylinder for the minimum of expended pump operating power.

Another object of my invention is to increase the efficiency of two-cycle engines generally and particularly engines of the Diesel type.

Another object is to provide a method of effecting the scavenging and/or supercharging operations in an engine cycle by air wherein the flow of air during the operation is controlled in a manner to render the operation more efficient.

Other objects of the invention and the invention itself will become more apparent from consideration of the following drawings and description wherein like parts are designated by like characters and wherein, Fig. 1 is an elevational view of a two cycle internal combustion engine;

Fig. 3 is a fragmentary view showing the cylinder illustrated in Fig. 2 prior to insertion of pistons which I may employ therein;

Fig. 4 is a section taken along the lines 4—4 of Fig. 3;

Fig. 5 is a section taken along the lines 5—5 of Fig. 3 and Fig. 6 is a transverse sectional view of a blower which I may employ in connection with the internal combustion engine illustrated in Fig. 1.

Figure 1:
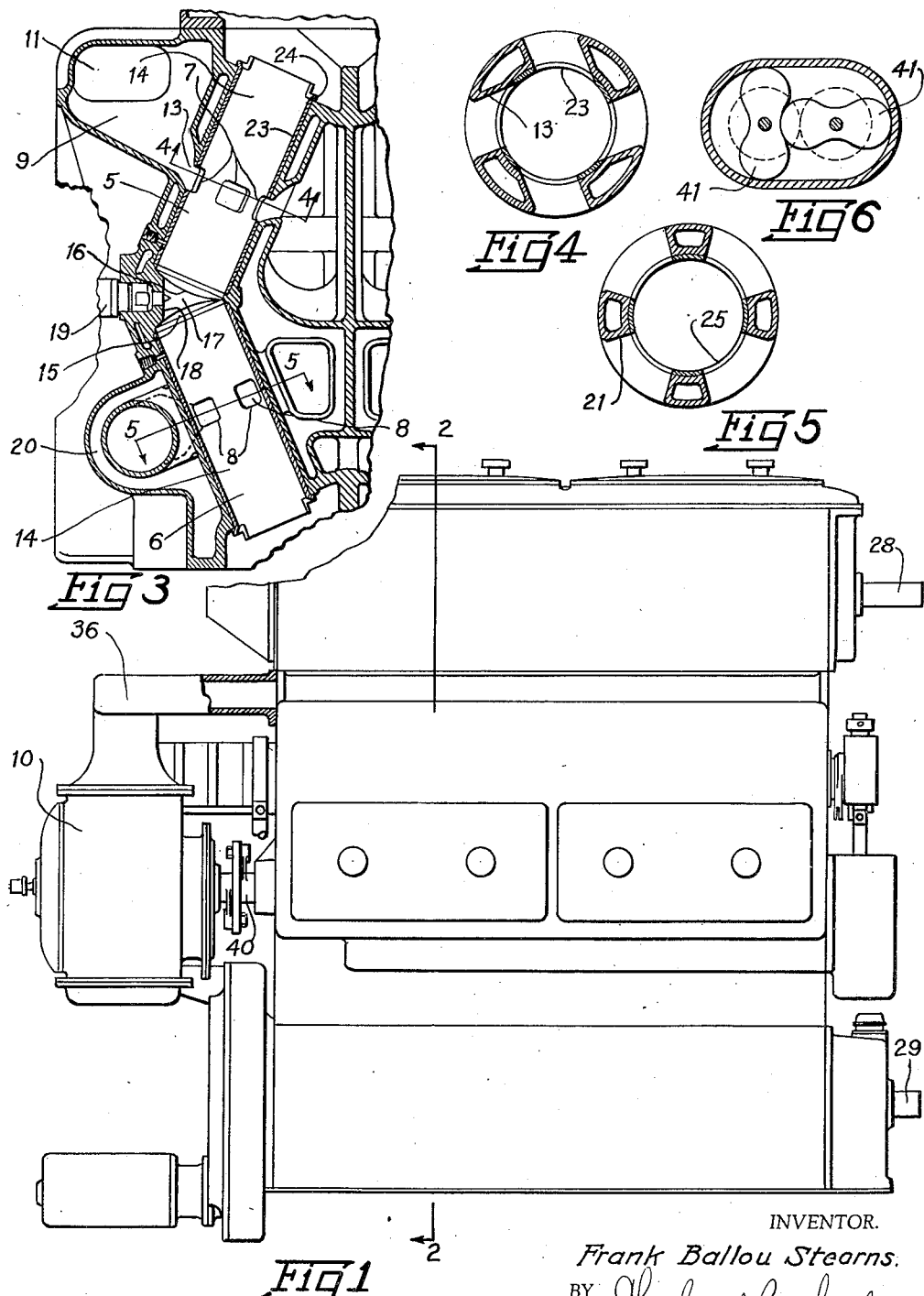
Figure 2:
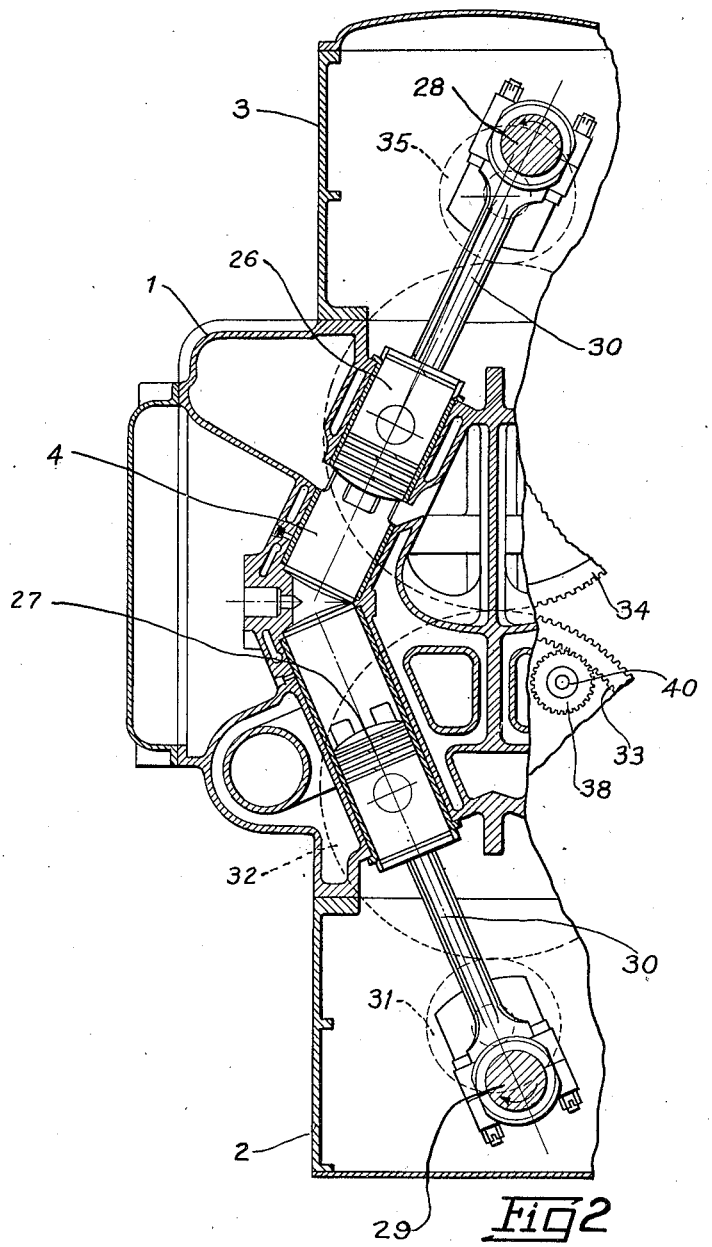
Fig. 2 is a fragmentary sectional view partially broken away taken along the lines 2—2 of Fig. 1.

Referring to the drawings, the engine block generally indicated at 1, is sealingly disposed intermediate a lower crank case 2 which serves as a supporting base and an upper crank case 3. The engine block 1 is provided with a plurality of generally V-shaped cylinders 4 alternately and oppositely disposed in parallel planes to form a general diamond formation of cylinders.

The cylinder 4 comprises an upper section 5 and a lower section 6 and forming legs of a V diverging respectively upwardly and downwardly from the apex thereof which is preferably positioned substantially on a horizontal axis of the engine. The upper section 5 is provided with a plurality of preferably equally spaced intake ports 7 and the lower section is provided with radial exhaust ports 8.

An air supply chamber 9 surrounds a major portion of the upper cylinder section 5 and is connected to a rotor or blower 10 adapted to supply air thereto by ports 11. The air supply chamber 9 communicates with the intake ports 7 through ducts 13 which extend downwardly towards and tangentially of the walls of section 5 as is most clearly illustrated in Fig. 4.

The upper section 5 and lower section 6 are generally similar and comprise the bored portions 14 extending the major portion of their length, the coaxially reduced bored portion 15, terminating in coaxial convexed portion 16 conforming generally to the crown of the piston. The convexed bored portions 16 together with the lateral walls of an intermediate portion form a combustion chamber 17 having a relatively thick wall 18 and which progressively decreases in cross-sectional area from the wall 18 to a point diametrically opposite.

A fuel injection nozzle 19 rigidly mounted in the wall 18 of the combustion chamber is adapted to periodically inject fuel oil under high pressure into the combustion chamber. The nozzle is so designed that the oil will be injected in the form of a comminuted spray whereby a more intimate mixture with the compressed air in the combustion chamber may be effected. A relatively high pressure is constantly maintained to the fuel injection nozzle such as 5000 lbs. to the square inch and the entry of this oil into the combustion chamber through the injection nozzle is controlled by a valve mechanism operable from the engine crank shaft and synchronized with the piston cycle so that the injection process occurs substantially at the completion of the compression stroke of the piston.

The lower section 6 is encircled by a relatively large manifold 20 which communicates with the ports 8 by radial ducts 21 which progressively increase in cross-sectional area from the section walls of the manifold thus enabling gases entering the manifold to rapidly expand and accelerating the exhaust of gases through the ports 8.

I preferably employ liners for the cylinder, the liners having substantially the same co-efficient of expansion as the engine block and thereby eliminate stresses due to fluctuations in the temperature. A liner 23 having a circular flange 24 engaging the outer face of section 5 and having intake ports aligned with the ports of the said section is tightly secured within the upper section 5 preferably by press-fitting.

As is clearly illustrated in Fig. 4, one edge of the ports of liner 23 is flared tangentially inward to conform to the generally tangential curve of the ducts 13 and thereby render a minimum resistance to the ingress of air to the section. A liner 25 generally similar to the liner 23 with the exception that the ports therein which are in alignment with the ports 8 of section 6 has the edges thereof disposed radially as is clearly illustrated in Fig. 5, rather than one edge disposed in a tangential direction.

Opposed pistons 26 and 27 are disposed in the upper and lower sections respectively and are connected to an upper crank shaft 28 and a lower crank shaft 29 by connecting rods 30. The crank shafts 28 and 29 are suitably journaled in the upper crank case 3 and the lower crank case 2, respectively, and preferably engage alternate oppositely disposed pistons on a common crank of the crank shaft.

The upper crank shaft preferably lags the lower crank shaft about 1.8° so that the lower piston on the working stroke uncovers the exhaust ports prior to uncovering of the intake ports by the upper, and the exhaust ports are closed prior to closing the intake ports.

The upper and lower crank shafts are connected by a train of gears, namely a pinion 31 rigidly secured to the lower crank shaft 29 and engaging a gear 32 internally toothed as indicated at 33 and which in turn engages a gear 34 meshing with a pinion 35 rigidly secured to the upper crank shaft 28. Since it is desirable that the opposed pistons 26 and 27 be simultaneously and similarly actuated by the expansion of gas within their common cylinder, the speed of the upper and lower crank shaft must necessarily be the same and to effect this it is desirable that the number of teeth and pitch diameter of the pinions 31 and 35 and the gears 32 and 34 be the same.

The rotor or blower 10 as is most clearly shown in Fig. 6 is preferably of the impeller type whose operation is characterized by certain peak pressures synchronized with the compression period of the blower. The blower 10 is connected to the ports 11 of air chamber 9 by means of a conduit 36. The blower is operated by the gear 32 which has the internal teeth thereof 33, engaging a pinion 38 integrally secured to a shaft 40 of the blower. The impeller blades of the blower are indicated at 41 thus having a definite relation to the speed of the crank shaft or to the piston cycle and by properly adjusting the gear ratio the admission of peak pressures of air at predetermined points on the piston cycle can be controlled.

In operating the engine air is admitted from chamber 9 by ports 7 to the upper cylinder section 5 while the burned gases from the preceding working stroke are being exhausted through the ports 8 in lower section 6. The ports 7 as previously described are inclined upwardly and tangentially to the upper section walls of the cylinder and consequently impart a whirling and longitudinal motion to the incoming charge of air in the direction of the combustion chamber 17. This incoming charge of air performs a dual function of scavenging substantially all of the remaining burned gases and of completely filling the portions of the cylinder intermediate the pistons with fresh air.

The exhaust ports 8 are preferably so disposed as to be uncovered prior to uncovering the intake ports 7 and due to the progressively increasing cross-sectional area of the exhaust ducts 21 together with the relatively large manifold into which they lead the burned gases within the cylinder can quickly be exhausted to a point approximately at and even below atmospheric pressure. The air then is suddenly admitted through the intake ports 7 at the peak pressure of the variable or surging air stream and added impetus is given to the scavenging operation through the energy possessed by the body of incoming air, and by the exhausting gases.

The exhaust valves are preferably closed by the lower opposed pistons sweeping over them slightly in advance of the closing of the air admission ports 7, to ensure that there will always be sufficient incoming air to effectively recharge the cylinder.

The intake ports are then closed by the pistons sweeping over them and the compression process begins, thus turbulently compressing the air finally within the combustion chamber 17 where it is forced divergently laterally toward the fuel injection nozzle 19 after it has attained fuel firing temperature. The fuel injection being synchronized with the piston cycle will be injected when the compressed air has attained fuel firing temperature and the ensuing expansion forces the pistons in opposed directions on the working stroke.

The use of two pistons in a common cylinder in opposed relation permits of a given volume of air to be compressed to substantially twice the pressure attained by utilizing a single piston in the same time interval. This means that even though a relatively short stroke were employed that air could be admitted at low pressures such as 4 lbs. per square inch and be sufficiently compressed in the compression chamber to raise the temperature to a point where the fuel will ignite therewith. Such a construction eliminates the necessity for having scavenging and charging air supplied to the cylinder at relatively excessive pressures.

As previously stated, there are certain peak pressures that are synchronized with the compression period of the impeller of a blower such as the Root type. It is obvious that to get the best results with scavenging and super-charging pressure that an engine cylinder should have the impulses properly timed for each cycle. It is also desirable that the blower be designed of such size so that each impulse or pumping action of the blower is sufficient to scavenge and supercharge its particular cylinder and also so timed as to apply the air most advantageously, and by this means obtain the maximum efficiency from the blower.

It is possible by designing a blower with a suitable number of impellers or by running a two-impeller blower at suitable speeds in relation to the number of cylinders, to attain peak pressures at the proper points of scavenging and supercharging periods of the cycles of a respective cylinder. For instance, this result could be satisfactorily obtained from a two-cylinder engine with a two-blade impeller running at one-half engine speed, a four-cylinder engine with a two-blade impeller running at engine speed, six-cylinder engine with a three-blade impeller running at engine speed, and an eight-cylinder engine with a two-blade impeller running at double engine speed, or two blowers with two blades each running at engine speed.

Thus a surge or peak pressure of air will be supplied to the air chamber surrounding the upper cylinder section simultaneously with the opening of the air admission ports 7. By thus synchronizing the pulses of an impeller type blower with the piston cycle, it is obvious that a considerably greater efficiency will be obtained than if the impulses were not so synchronized. For instance, at points intermediate the peak pressures of the blower both the volume of air and the kinetic energy thereof will be relatively less and consequently if air were supplied at these values a relatively larger blower would necessarily be employed resulting in increased power consumption and decreased efficiency of the engine.

Although I have shown and described an embodiment of my invention I contemplate that numerous departures may be made therefrom without departing from the spirit and scope of my invention and the scope of the appended claims.

Having thus described my invention, what I claim is:—

1. The method of scavenging and super-charging internal combustion engines of the type provided with a blower or the like supplying air to a plurality of cylinders all surrounded by a common large volume air supply chamber, which includes causing the blower to supply to the chamber air under pressure and having cyclical fluctuations in the pressure thereof occurring substantially simultaneously in all parts of the chamber and timing the admission of air from the chamber to the cylinders successively so as to occur substantially at the peak pressure thereof.

2. In an internal combustion engine of the Diesel type, a plurality of cylinders having pistons reciprocable therein, and air intake ports in the walls of each cylinder disposed to be covered and uncovered by the piston therein, a common air chamber surrounding all of the cylinders and communicating with all of the intake ports, an air pump driven by the engine supplying air at undulating pressure to the chamber and causing peaks of the undulating pressure to occur in all parts of the chamber substantially simultaneously, and the opening of the air intake ports and the pump pressure undulations being synchronized to cause the intake ports of the several cylinders to open successively and in each case substantially simultaneously with the occurrence of a peak of pressure in the air chamber.

3. The method of scavenging and supercharging internal combustion engines of the type provided with a blower or the like supplying air to a plurality of cylinders all disposed to receive air from a common large volume air supply chamber, which includes causing the blower to supply to the chamber air under pressure and having cyclical fluctuations in the pressure thereof occurring substantially simultaneously in all parts of the chamber and timing the admission of air from the chamber to the cylinders successively so as to occur substantially at the peak pressure thereof.

4. In an internal combustion engine of the Diesel type, a plurality of cylinders having pistons reciprocable therein, and air intake ports in the walls of each cylinder disposed to be covered and uncovered by the piston therein, a common air chamber disposed adjacent to all of the cylinders and communicating with all of the intake ports, an air pump driven by the engine supplying air at undulating pressure to the chamber and causing peaks of the undulating pressure to occur in all parts of the chamber substantially simultaneously, and the opening of the air intake ports and the pump pressure undulations being synchronized to cause the intake ports of the several cylinders to open successively and in each case substantially simultaneously with the occurrence of a peak of pressure in the air chamber.

5. In an engine, a plurality of cylinders each having intake and exhaust ports, opposed pistons sealingly and reciprocatingly disposed in the cylinders, and adapted to open and close said intake and exhaust ports of the several cylinders successively, an air supply chamber surrounding all of the cylinders and in communication with said intake ports and an exhaust manifold in communication with said exhaust ports, a pump driven by the engine supplying air to the chamber under undulating pressure to cause peaks of pressure to occur in all parts of the chamber substantially simultaneously, and the pistons being timed to open the intake ports of their respective cylinders upon the occurrence of a peak of pressure in the chamber.

6. An internal combustion engine comprising a plurality of cylinders each comprising a pair of upper and lower cylinder portions, intake and exhaust ports in the upper and lower cylinders respectively, opposed pistons sealingly and reciprocatingly disposed in the pairs of cylinder portions respectively and adapted to open and close the ports of the several cylinders successively, a crank shaft journaled above and aligned with the upper cylinder portions, a second crank shaft journaled below and aligned with the lower cylinder portions, connecting rods reciprocatingly joining said pistons with said crank shafts, a combustion chamber intermediate said pistons, a fuel injection element mounted in said combustion chamber, means operable by the engine for intermittently injecting fuel into said chamber, air supply means comprising a chamber surrounding all of the upper cylinder portions and communicating with the intake ports and a pump driven by the engine supplying to the chamber air under undulating relatively low pressure, and the pump being timed so that the peak pressures of the air supply will occur relative to the piston cycle to provide peaks of pressure upon the successive opening of the intake ports of the successive cylinders, and the peaks of pressure occurring substantially simultaneously in all parts of the chamber.

7. In an engine, a plurality of cylinders each having intake and exhaust ports, opposed pistons sealingly and reciprocatingly disposed in the cylinders, and adapted to open and close said intake and exhaust ports of the several cylinders successively, an air supply chamber disposed adjacent to all of the cylinders and in communication with said intake ports and an exhaust manifold in communication with said exhaust ports, a pump driven by the engine supplying air to the chamber under undulating pressure to cause peaks of pressure to occur in all parts of the chamber substantially simultaneously, and the pistons being timed to open the intake ports of their respective cylinders upon the occurrence of a peak of pressure in the chamber.

8. An internal combustion engine comprising a plurality of cylinders each comprising a pair of upper and lower cylinder portions, intake and exhaust ports in the upper and lower cylinders respectively, opposed pistons sealingly and reciprocatingly disposed in the pairs of cylinder portions respectively and adapted to open and close the ports of the several cylinders successively, a crank shaft journaled above and aligned with the upper cylinder portions, a second crank shaft journaled below and aligned with the lower cylinder portions, connecting rods reciprocatingly joining said pistons with said crank shafts, a combustion chamber intermediate said pistons, a fuel injection element mounted in said combustion chamber, means operable by the engine for intermittently injecting fuel into said chamber, air supply means comprising a chamber disposed adjacent to all of the upper cylinder portions and communicating with the intake ports and a pump driven by the engine supplying to the chamber air under undulating relatively low pressure, and the pump being timed so that the peak pressures of the air supply will occur relative to the piston cycle to provide peaks of pressure upon the successive opening of the intake ports of the successive cylinders, and the peaks of pressure occurring substantially simultaneously in all parts of the chamber.

FRANK BALLOU STEARNS.